United States Patent [19]

Suzuki

[11] 4,449,144
[45] May 15, 1984

[54] APPARATUS FOR DETECTING MOVING BODY

[75] Inventor: Masatoshi Suzuki, Shiga, Japan

[73] Assignee: Omron Tateisi Electronics Co., Kyoto, Japan

[21] Appl. No.: 392,246

[22] Filed: Jun. 25, 1982

[30] Foreign Application Priority Data

Jun. 26, 1981 [JP] Japan ................................ 56-100309
Jun. 30, 1981 [JP] Japan ................................ 56-102698

[51] Int. Cl.³ .......................................... H04N 3/10
[52] U.S. Cl. .................................. 358/105; 358/107; 358/903; 382/31; 364/565
[58] Field of Search ...................... 358/105, 107, 903; 340/618, 669, 670; 364/431.07, 438, 516, 576, 565, 572, 724–725, 726; 382/31

[56] References Cited

U.S. PATENT DOCUMENTS

3,636,330 1/1972 Holeman et al. ...................... 382/31
3,993,976 11/1976 Ginsburg ................................ 382/31
4,063,281 12/1977 Kormreich et al. ................. 358/105
4,161,750 7/1979 Kamin ................................... 358/105

OTHER PUBLICATIONS

Pearson, D. E., "A Simple Motion Detector for Television Signals", Jan. 1973, Journal of the SMPTE, vol. 82, pp. 17–21.

Primary Examiner—John C. Martin
Assistant Examiner—Edward L. Coles
Attorney, Agent, or Firm—Cushman, Darby & Cushman

[57] ABSTRACT

A moving body detecting apparatus comprises a television camera for picking up an object and delivering video signals thereof, a memory for storing values of spatial filter function in corresponding relation to the picture elements of the television camera, a multiplier for multiplying the video signals by the spatial filter function read out from the memory in synchronism with scanning by the television camera, an integrator for integrating the multiplied signals for a required area, and a calculating device for calculating the desired information as to the moving body, such as its speed, from the result of integration.

9 Claims, 21 Drawing Figures

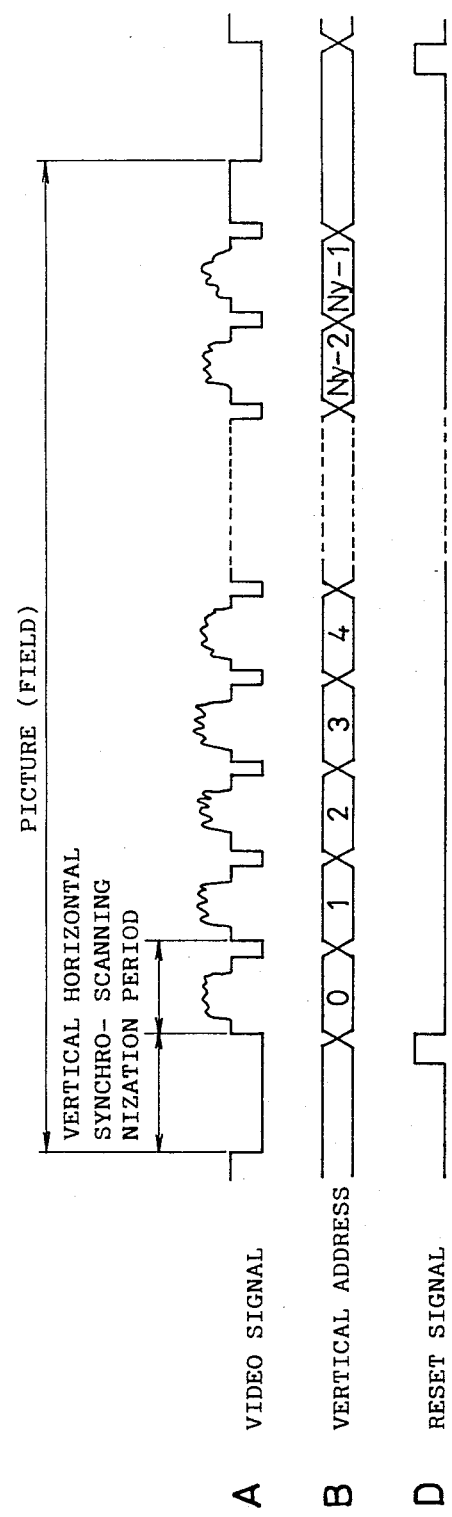
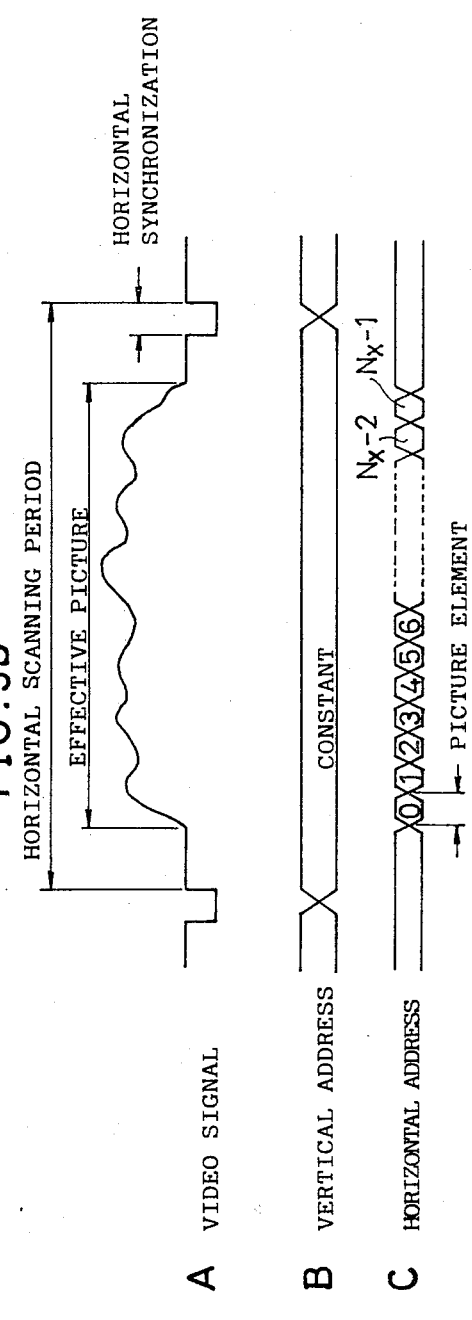

D RESET SIGNAL
E AREA SPECIFYING SIGNAL
G $f(x,y)[\cos]$

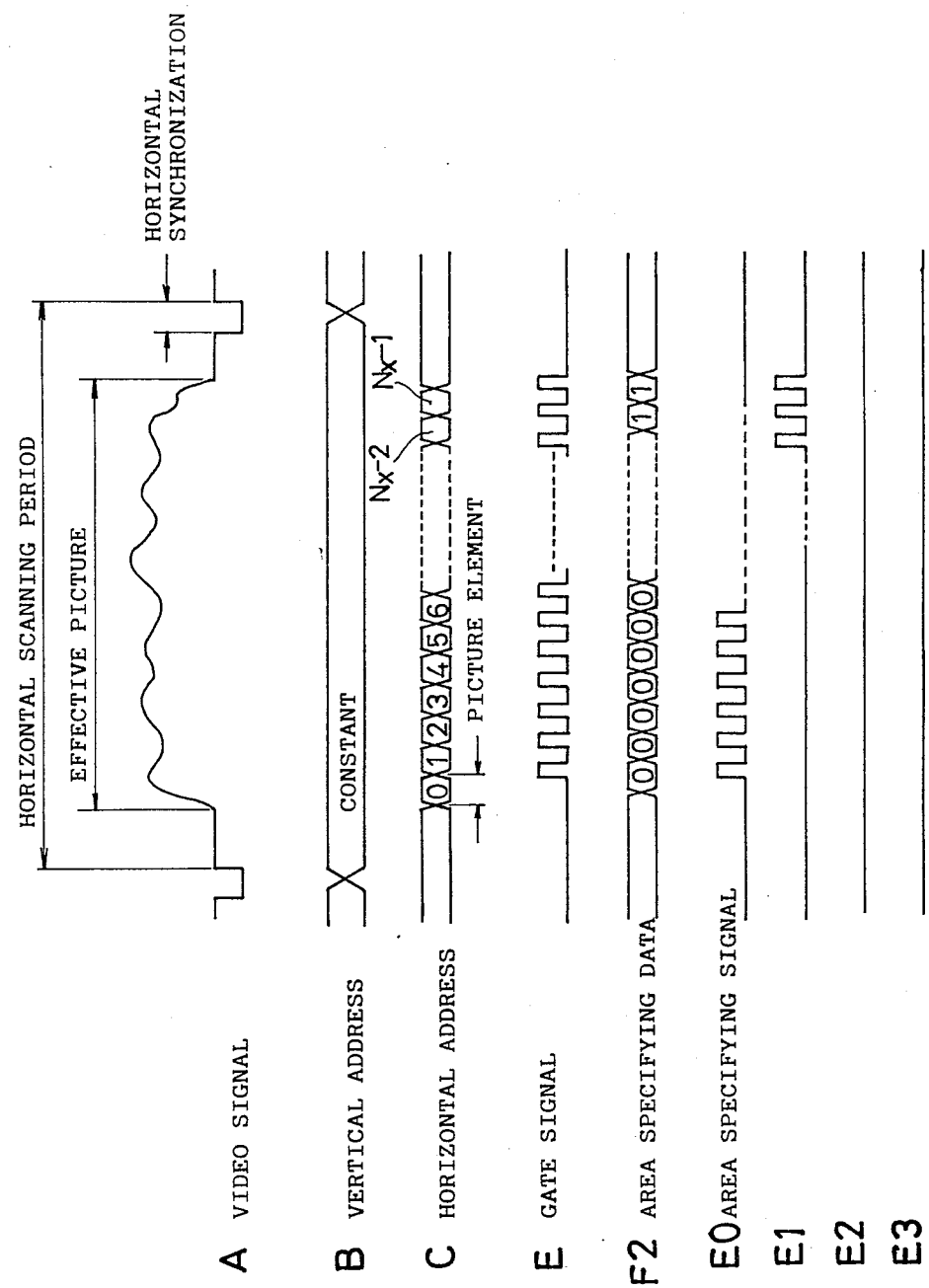

APPARATUS FOR DETECTING MOVING BODY

BACKGROUND OF THE INVENTION

The present invention relates to an apparatus for detecting moving bodies, and more particularly to an apparatus for detecting a moving body, measuring the speed of the body and discriminating the shape of the body by picking up the moving body with a television camera and processing the video signals delivered from the camera.

Such moving body detecting apparatus include those using a spatial filter. The spatial filter is disposed in the image forming plane of an objective lens or reflecting mirror, inhibits the influence of the irradiation of light from the background other than an object and included in the field of view of an optical system and is used effectively for detecting the object with improved ability and for measuring the speed of the object. More specifically the spatial filter comprises a reticle or grating arranged in the image forming plane of the optical system, or a photoelectric transducer per se which is composed of a large number of photoelectric elements arranged in parallel with one another. Reticles or gratings further include a photoelectric reticle comprising opaque portions and transparent portions which are arranged alternately and controlled to move in one direction in this arrangement. With such a reticle or an array of photoelectric elements, however, the component elements are arranged at a definite spacing, so that the spatial frequency is fixed to a value determined by the spacing. The system is therefore capable of detecting only a specific frequency component of the object and is not usable universally.

SUMMARY OF THE INVENTION

An object of the present invention is to provide a moving body detecting apparatus which is capable of selecting the desired spatial frequency component and which is universally usable.

Another object of the invention is to provide a moving body detecting apparatus which is adapted for high-speed processing and is therefore useful also for bodies moving at high velocities.

Another object of the invention is to detect a moving body with improved accuracy by blocking the brightness of the background.

Another object of the invention is to provide a moving body detecting apparatus which is capable of obtaining an individual item of information as to each of moving bodies included in the field of view of a television camera.

The present invention provides an apparatus for detecting a moving body comprising pickup means for picking up an object and delivering video signals thereof, memory means for storing values of spatial filter function in corresponding relation to the picture elements of the pickup means, means for successively reading out from the memory means the values of spatial filter function corresponding to the picture elements in timed relation with scanning by the pickup means, means for multiplying the read-out spatial filter function values by the video signals from the pickup means, means for integrating the multiplied signals for a required area, and means for calculating required information as to the object from the result of integration. The spatial filter function stored in the memory means provides an electrically equivalent spatial filter, so that by varying the spatial filter function to be stored, the desired spatial frequency component of the object can be selected. Thus the apparatus is universally usable.

Other features and detailed construction of the present apparatus will become apparent from the following description of embodiments with reference to the accompanying drawings.

BRIEF DESCRIPTION OF THE DRAWINGS

FIG. 3a to FIG. 3c are time charts showing output signal wave forms;

FIG. 13a to FIG. 13c are time charts showing output signal wave forms;

DESCRIPTION OF THE PREFERRED EMBODIMENTS

Figure 1:
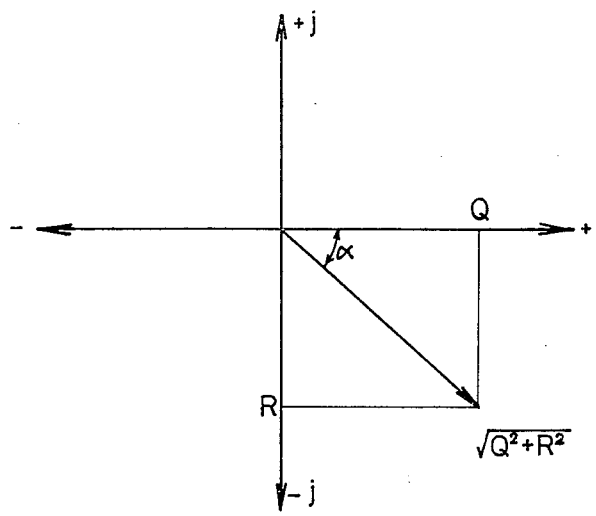
FIG. 1 shows a spatial filter output as a vector on a complex number plane.

An embodiment will be described below in which a television camera (hereinafter referred to as "TV camera") is used as means for picking up objects. The image pattern of an object picked up by a TV camera through a lens system is represented by a function f(x,y). The function of spatial frequency of the image pattern, F(U,V), is represented by the following equation.

$$F(U,V) = \int\int_S f(x,y)\exp\{-j(Ux + Vy)\}dxdy \qquad (1)$$

wherein S is the area of integration which is the area of the image projected on the TV camera or a smaller area. The term $\exp\{-j(Ux+Vy)\}$ is called spatial filter function. U and V are spatial frequency components (angular velocities) in X and Y directions. Assuming that $\lambda_x$ and $\lambda_y$ are the wavelengths in X and Y directions, these components are represented by the following equations.

$$U = 2\pi/\lambda_x \qquad (2)$$

$$V = 2\pi/\lambda_y \qquad (3)$$

The spatial frequency $\Phi$ and the direction $\Lambda$ of its vector based on U axis are represented by the following equations.

$$\Phi = \sqrt{U^2 + V^2}/2\pi \quad (4)$$

$$\theta = \tan^{-1}\frac{V}{U} \quad (5)$$

Equation (1) is expressed as follows in terms of trigonometric function.

$$F(U,V) = \int\int sf(x,y) \times \{\cos(Ux + Vy) - j\sin(Ux + Vy)\}dxdy \quad (6)$$

$$= \int\int sf(x,y)\cos(Ux,Vy)dxdy - j\int\int sf(x,y)\sin(Ux + Vy)dxdy$$

The function F(U,V), which is the output of a spatial filter equivalently provided by the electric circuit to be described later, is termed spatial filter output.

When an object within the field of view of the TV camera is moving, the spatial filter output F(U,V) is a sine wave (or cosine wave) which changes with a period T in inverse proportion to the speed of movement of the object. Assuming that the wavelength of the spatial frequency (the pitch of the imaginary spatial filter) is P, the speed of movement, W, of the object is given by $$W = P/T \quad (7)$$

wherein $$P = 2\pi/\sqrt{U^2+V^2} \quad (8)$$

Only one of the first and second right terms of Equation (6) will suffice for calculating the speed W.

Since the function F(U,V) is in terms of complex number, it will be represented as a vector on a complex number plane as shown in FIG. 1. It is to be noted that $$Q = \int\int sf(x,y)\cos(Ux + Vy)dxdy \quad (9)$$

$$R = -\int\int sf(x,y)\sin(Ux + Vy)dxdy \quad (10)$$

$$\alpha = \tan^{-1}\frac{R}{Q} \quad (11)$$

The speed of movement, W, of the object can also be determined by obtaining the phase angle $\alpha$ every time one picture is scanned and calculating the variation $\Delta\alpha$ involved. The speed is given by $$W = \frac{\Delta\alpha}{\sqrt{U^2 + V^2}} \cdot \frac{1}{\tau} \quad (12)$$

wherein $\tau$ is the scanning time for one picture and is about 16.7 ms in the case of one field. The direction of the movement of the object can be known from the polarity (positive or negative) of $\Delta\alpha$.

Since the spatial frequency $\Phi$ is defined by the values of U and V, the spatial frequency $\Phi$ can be altered by varying these values U and V. This is equivalent to the varying of the spacing between the components of the reticle or array of photoelectric elements constituting the foregoing spatial filter. As will be described below, the values of U and V can be set as desired according to the invention, so that the desired spatial frequency component of the object is available, hence universally useful.

Figure 2:
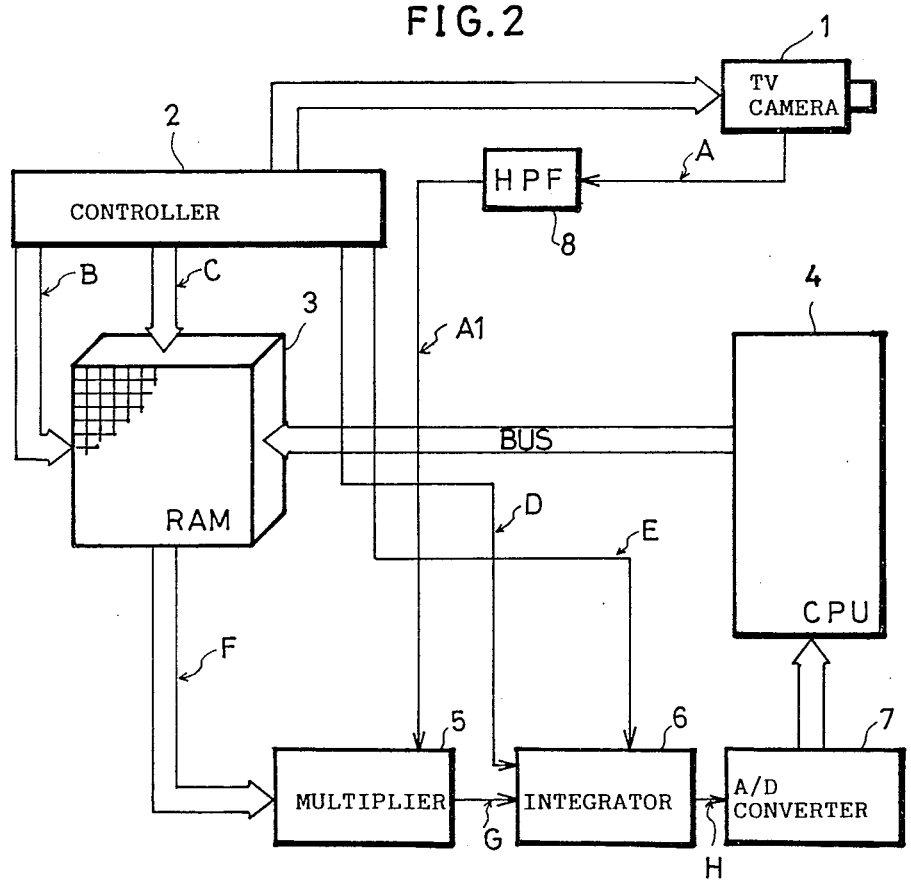
FIG. 2 is a block diagram showing an embodiment of the invention.
Figure 3C:
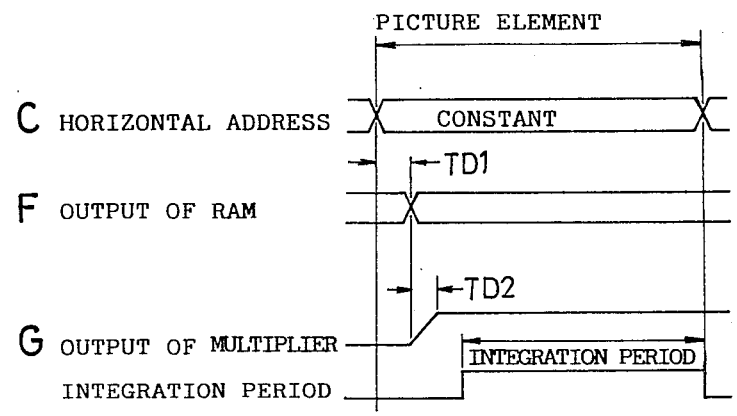
Figure 4:
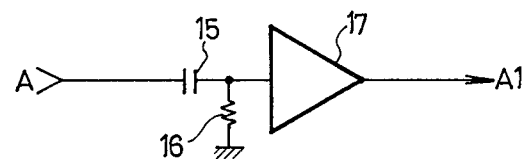
FIG. 4 is an electric circuit diagram showing an example of high pass filter.
Figure 5:
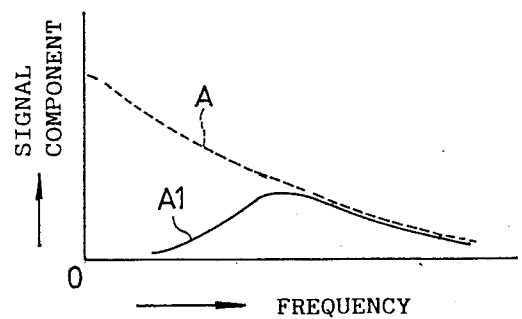
FIG. 5 is a graph showing a frequency component of a video signal.

FIG. 2 shows the construction of the embodiment for determining the speed W of movement of the object according to Equation (7). FIGS. 3a and 3c show the output signals from some blocks of the apparatus. FIG. 3a shows signals in one field. FIG. 3b shows signals during a horizontal scanning period on an enlarged scale. FIG. 3c shows signals for one picture element on a further enlarged scale. A TV camera 1 picks up the object, gives the resulting video signal A and is controlled by a control circuit 2. The video signal A represents the foregoing function f(x,y) and has its low frequency components and d.c. components cut off by a high pass filter 8, giving a video signal A1 consisting only of high frequency components. As indicated by a broken line in FIG. 5, the video signal A contains many low frequency components and direct current components which are attributable chiefly to the brightness of the background of the object, etc. The video signal A1 passing through the filter 8 is indicated by a solid line in FIG. 5. Preferably the filter 8 is adapted to cut off the components of lower frequencies than a frequency corresponding to the spatial frequency in Y direction to be derived. It is also effective to cut off the components of lower frequencies than the scanning frequency (about 60 Hz) of the TV camera 1. More specifically the filter 8 comprises a differentiation circuit composed of a capacitor 15 and a resistor 16, and an amplifier 17 as shown in FIG. 4.

The control circuit 2 emits a vertical synchronization signal and a horizontal synchronization signal to control the camera 1 and also produces a vertical address signal B and a horizontal address signal C in synchronism with these signals. The control circuit 2 further produces the reset signal D and area specifying signal E to be described later.

Figure 6:
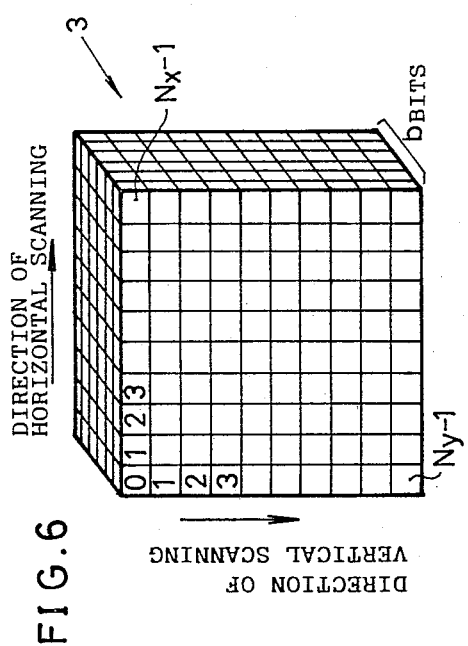
FIG. 6 shows the construction of a RAM.

A memory (hereinafter referred to as "RAM") 3 stores cos (Ux+Vy) (or $-\sin$ (Ux+Vy), to be represented by cos (Ux+Vy) and expressed simply as "cos") of Equation (6). If the values U and V are predetermined, the cos is dependent on the variables x and Y and are positive and negative values. As shown in FIG. 6, the RAM 3 has memory locations equal in number to the number of the picture elements on the TV camera 1. Each location has a capacity of storing b-bit (in the present embodiment 8-bit) information. The number of the picture elements (memory locations) in the horizontal scanning direction (X direction) is $N_x$, and that in the vertical scanning direction (Y direction) is $N_y$. Each memory location of the RAM 3 has stored therein the cos value for the corresponding picture element (x,y) on the TV camera 1. Since the cos value can be positive and negative, the most significant digit (bit) (MSB) of the 8 bits stored in the location represents a positive or negative value, and the other 7 digits represent the absolute value. The memory location of the RAM 3 is addressed by address signals B and C from the control circuit 2, and the cos value is read out in synchronism with the scanning of the camera 1.

Figure 7:
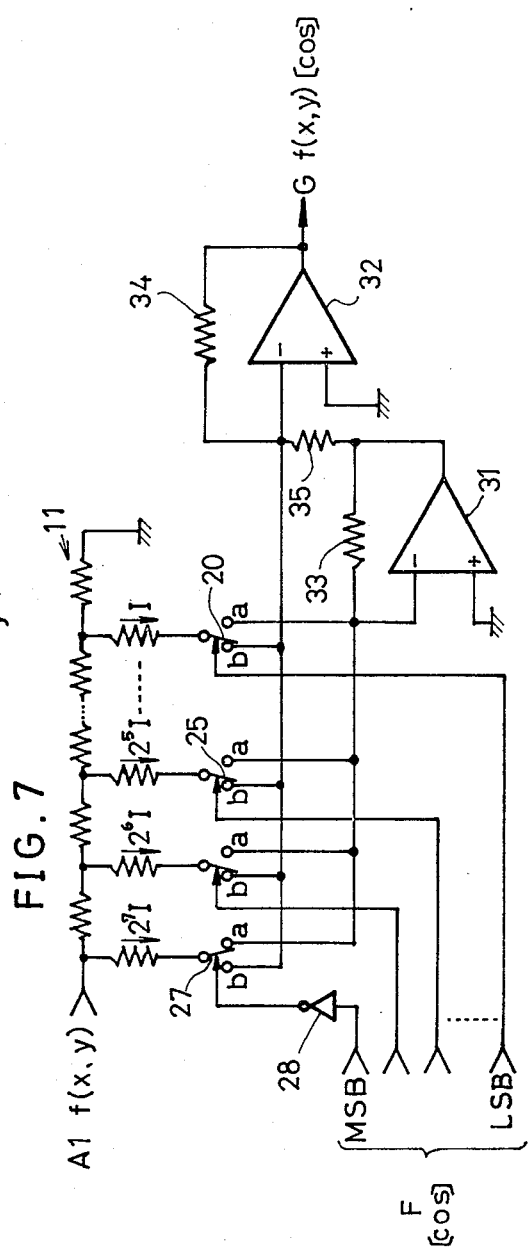
FIG. 7 is an electric circuit diagram showing an example of multiplier.

A multiplier 5 receives the video signal A1 from the TV camera 1 and a signal F representing the cos value read out from the RAM 3. The multiplier 5 calculates f(x,y)·cos. FIG. 7 shows an example of multiplier 5. The video signal A is an analog signal, and the cos value is represented by a digital signal. The multiplier 5 has a DA converting function and gives the result of multiplication as an analog signal G. The multiplier 5 comprises a ladder type resistor circuit 11 adapted to receive the video signal A1 and having eight output terminals, switches 20 to 27 connected to the output terminals of the resistor circuit 11 and controllable by the digits of the signal F, a first addition circuit composed of an inversion amplifier 31 and a resistor 33 for adding the outputs from terminals a of these switches, and a second addition circuit composed of an inversion amplifier 32 and a resistor 34 for adding the output from the first addition circuit and the outputs from terminals b of the switches and giving an output signal G. The signal F has a weight (involution of 2) according to each digit thereof. The resistor circuit 11 divides the video signal A1 in accordance with the weights. Suppose a current I flows into the switch 20, a current $2^7$I flows into the switch 27. Of the digits of the signal F, the MSB only is inverted by a NOT circuit 28, and the switch 27 is controlled by the inverted digit. When a digit of the signal F is 0, the corresponding switch, other than the switch 27, is closed at b. If it is 1, the switch is closed at a. When the switches 20 to 27 are in the state shown in FIG. 7, the signal F is 00000000. The resistors 33 and 34, and a resistor 35 connected between the output terminal of the amplifier 31 and the inversion input terminal of the amplifier 32 have such predetermined values that the signal G will be 0 in this case. For example, values of the signal G are given below in corresponding relation to values of the input signal F. When MSB is 0, the cos is positive, while if it is 1, the cos is negative.

```
       F              G
MSB        LSB
0 1 1 1 1 1 1 1 → A1 × (127/128)
       .              .
       .              .
0 0 0 0 0 0 0 1 → A1 × (1/128)
0 0 0 0 0 0 0 0 →      0
1 1 1 1 1 1 1 1 → A1 × (−1/128)
       .              .
       .              .
1 0 0 0 0 0 0 1 → A1 × (−127 × 128)
1 0 0 0 0 0 0 0 → A1 × (−1)
```

Figure 8:
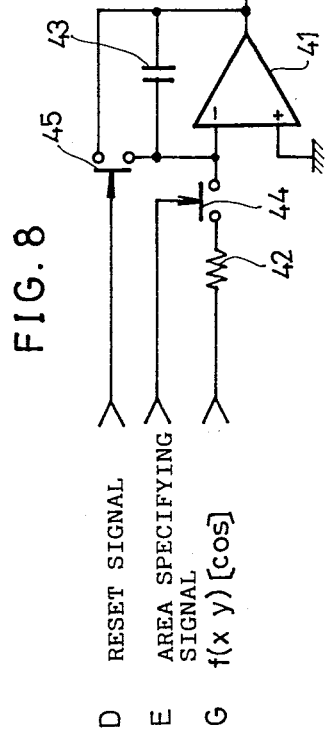
FIG. 8 is an electric circuit diagram showing an example of integrator.

An integrator 6 functions to integrate the output signal G from the multiplier 5. FIG. 8 shows an example of integrator 6, which comprises an operational amplifier 41, an input resistor 42 therefor, a capacitor 43 connected between the inversion input terminal and the output terminal of the amplifier 41, a switch 44 connected between the inversion input terminal and the resistor 42, and a switch 45 for short-circuiting the capacitor 43. A reset signal D is given for starting the scanning of one picture (one field or one frame). The switch 45 is turned on by the reset signal D, whereby the capacitor 43 is discharged to reset the integrator 6. The scanning period for one picture includes a retrace time during which there is no video signal. Further as seen in FIG. 3c, there is a time delay TD1 for reading out the cos from the RAM 3, and the multiplier circuit 5 involves a time delay TD2. The area specifying signal E excludes such retrace period and delays to determine an integration period for integrating the effective input signal only. The switch 44 is on only during the integration period to feed the signal G to the amplifier 41. The integrator 6 delivers an output H which represents the first or second right term of Equation (6). The output signal H is converted by an AD converter circuit 7 to a digital signal, which is read by a CPU 4. When measuring a period T, the converter circuit 7 needs only to detect the polarity (positive or negative) of the signal H as will become apparent later.

As already stated, the cos value is digital, and it is suitable to express the value in about 8 bits in view of economy. When each memory location of the RAM 3 has an increased capacity, the cos value can be expressed with correspondingly higher accuracy. This however renders the RAM 3 more expensive and the multiplier circuit 5 more complex. The video signal A is an analog signal and contains many low frequency components and direct current components as already stated. Accordingly the result of multiplication of the signal A by the signal F is governed by these components of the signal A. Further since the signal F represents an approximate value expressed in 8 bits, there is a likelihood that the signals G and H will become inaccurate. Nevertheless, because the low frequency components and direct current components are eliminated from the video signal A by the high pass filter 8, the result of multiplication G and the result of integration H are accurate.

The CPU 4 performs writing of the cos to the RAM 3, processing for calculating the speed of movement of the object based on the data read from the AD converter circuit 7, etc. Preferably the CPU 4 is a microprocessor.

Figure 9:
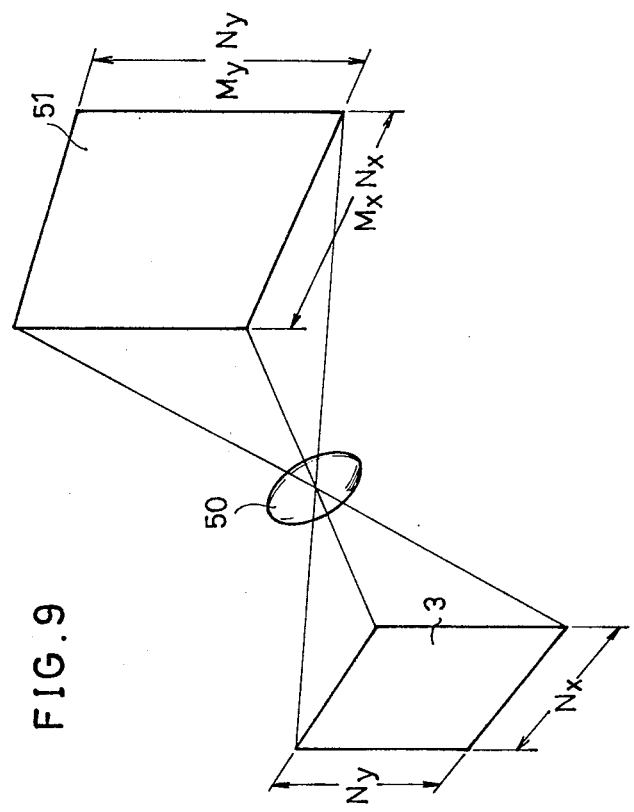
FIG. 9 shows the relation between the field of view of a TV camera and the RAM.

FIG. 9 shows the field of view 51 of the TV camera 1, the lens 50 within the camera 1, and the RAM 3 in corresponding relation to the image formed on the camera 1. As stated above, the RAM 3 has $N_x \times N_y$ memory locations eqaul in number to the number of picture elements of the TV camera 1. The length of the field of view 51 corresponding to the horizontal length of one picture element is expressed by $M_x$, and the length of the field of view 51 corresponding to the vertical length of one picture element is expressed by $M_y$. The field of view 51 has lengths $M_x N_x$ and $M_y N_y$ in the horizontal and vertical directions respectively.

Figure 10:
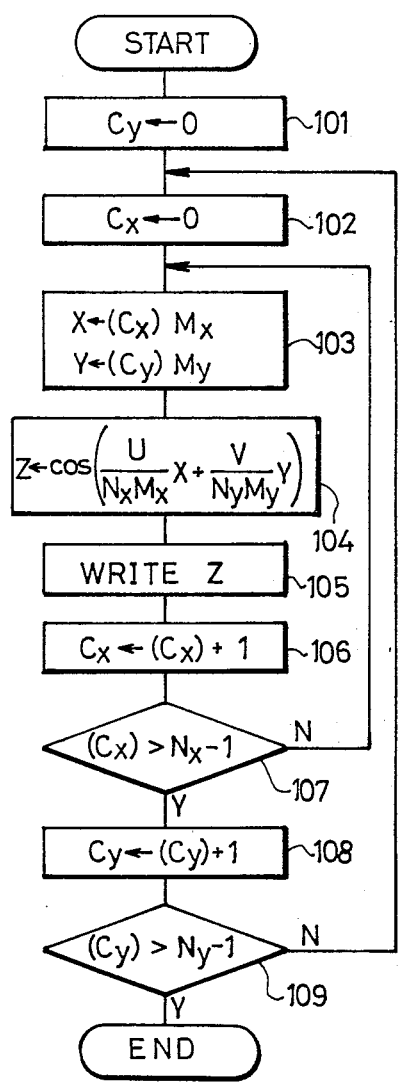
FIG. 10 is a flow chart showing a process for writing a spatial filter function to the RAM.

FIG. 10 shows a process for writing the cos to the RAM 3 by the CPU. The process is performed when the CPU 4 is initialized. The addresses in X and Y directions of each memory location of the RAM 3 are specified by address counters $C_x$ and $C_y$, the contents thereof being represented by $(C_x)$ and $(C_y)$ respectively. The spatial frequency components U and V as divided by $2\pi$ represent the pair number of spatial filters electrically provided by the circuit of FIG. 2. It is assumed that the U and V are predetermined. The magnifications $M_x$ and $M_y$ are also predetermined.

With reference to FIG. 10, 0 is set on the address counters $C_x$ and $C_y$ (steps 101 and 102). The counter contents $(C_x)$ and $(C_y)$ are multiplied by the magnifications $M_x$ and $M_y$ to give values X and Y respectively (step 103). With use of these X, Y, the above U, V, $N_x$, $N_y$ and $M_x$, $M_y$, $$\cos\left(\frac{U}{N_x M_x} X + \frac{V}{N_y M_y} Y\right)$$

is calculated to give a result Z (step 104). The calculation may be performed in terms of sine instead of cosine. The Z obtained from step 104 is written to the memory location of the RAM 3 addressed by the address counters $C_x$ and $C_y$ (step 105). In step 106, 1 is added to the contents of the counter $C_x$. Step 107 checks whether the renewed $(C_x)$ is in excess of $N_x - 1$. If step 107 is NO, step 103 follows. The above procedure is repeated with use of the new $(C_x)$. If the step 107 is YES, one horizontal scanning operation is completed, so that 1 is added to the contents of the counter $C_y$ (step 108). Step 109 checks whether the refreshed $(C_y)$ is in excess of $N_y - 1$.

If step 109 proves NO, the sequence returns to step 102 to change ($C_x$) to 0. The procedure of steps 102 to 107 is repeated $N_x$ times. When step 109 becomes YES, the cos is written completely to all the memory locations of the RAM 3.

Figure 11:
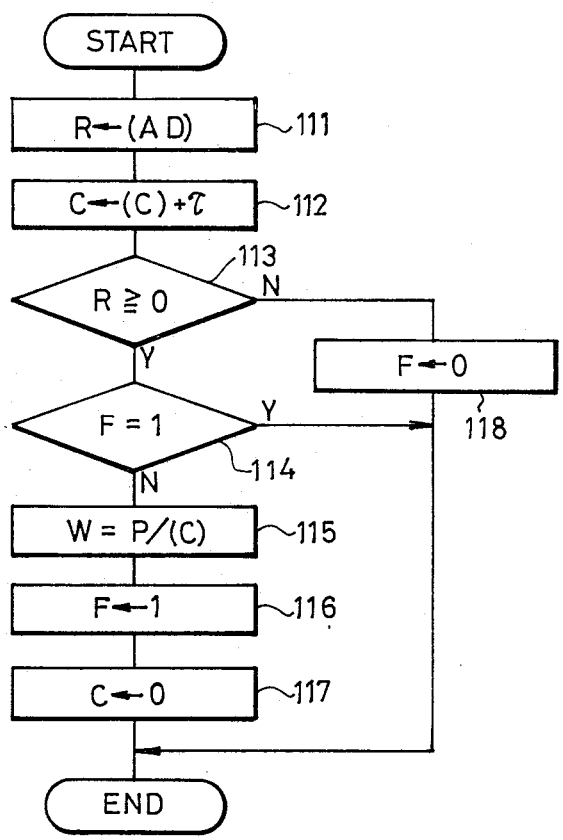
FIG. 11 is a flow chart showing an arithmetic process for measuring the speed of movement.

FIG. 11 shows a process for calculating the speed of movement W of the object by the CPU 4. This process is started by an interruption with an input from the AD converter circuit 7 every time one picture is completely scanned by the TV camera 1. The process is executed upon every interruption. The data read from the circuit 7 upon every interruption is expressed as (AD). It is assumed that the pitch P of the spatial filters is already calculated as $$P = 2\pi / \sqrt{\left(\frac{U}{N_x M_x}\right)^2 + \left(\frac{V}{N_y M_y}\right)^2}.$$

With reference is FIG. 11, AD-converted data (AD) is read from the AD converter circuit 7 and loaded into a register R in the CPU 4 (step 111). Scanning period $\tau$ is added to a period counter C in the CPU 4 (step 112). Subsequently the data in the register R is checked as to whether it is positive or 0 (step 113). Since the data (AD) is a sine wave varying with a period T as stated, the data is positive, 0 and negative. In the present process, the period T is measured upon the change of the data (AD) from negative to positive (to be referred to as "rise" for convenience). If the (AD) is negative, a rise detecting flag F is reset to 0 (step 118), whereupon the interruption process is completed. Even if (AD) is 0 or positive, the interruption process is completed when the flag F has already been set to 1 (YES for step 114).

When (AD) is 0 or positive (YES for step 113) with the flag F reset (NO for step 114), a judgment of rise is made. The count C on the counter C indicates the period of time from the preceding rise until the current rise, and this is equal to the period T. The speed of movement, W, is calculated from the count C and the pitch P (step 115). The flag F is set to 1 in step 116. The counter C is cleared in step 117.

While the operation for the right member of Equation (6) is conducted by the multiplier 5 and the integrator 6 in the above embodiment, the video signal A1 may be AD-converted and fed to the CPU 4, which may thereafter perform the operation.

Figure 12:
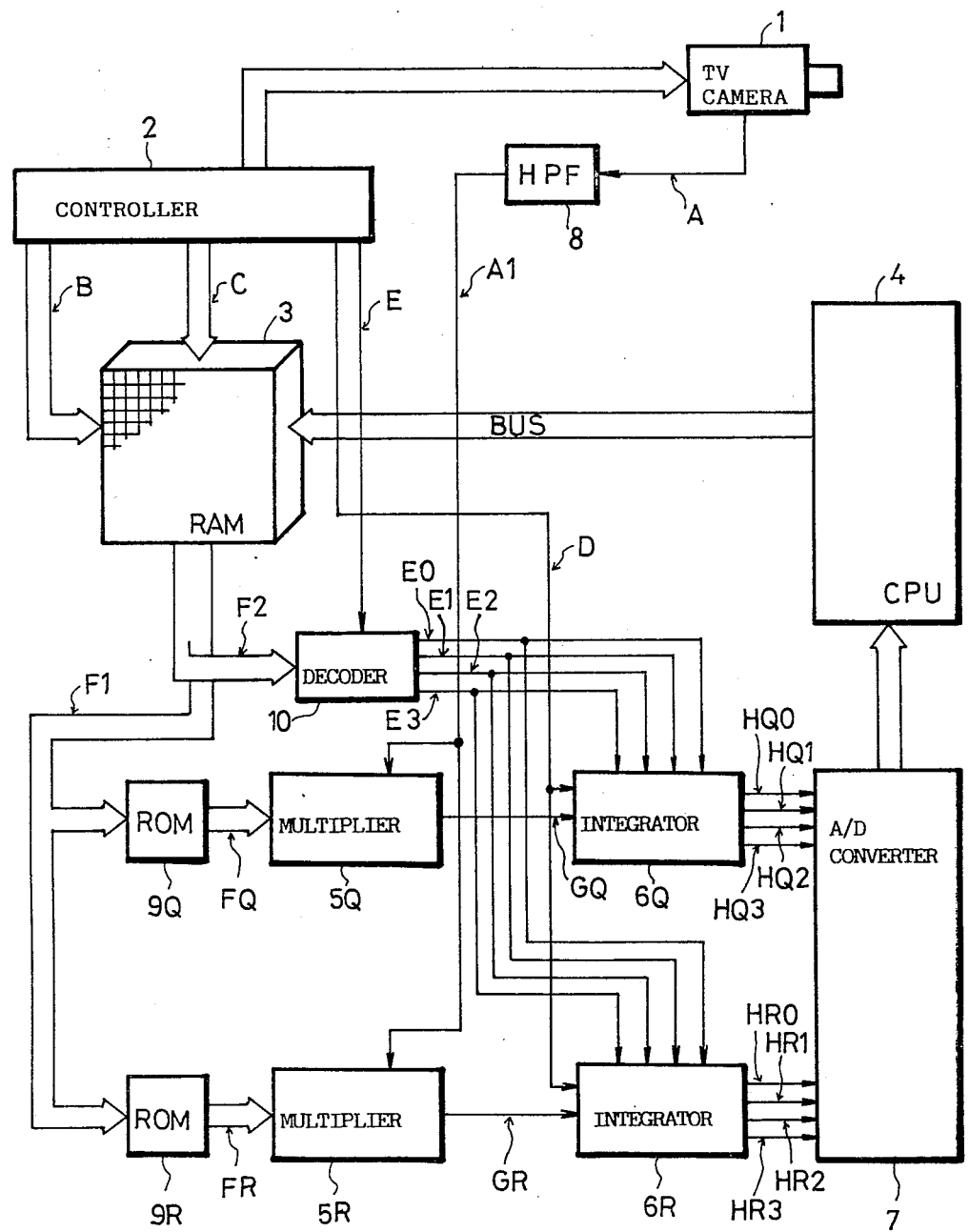
FIG. 12 is a block diagram showing another embodiment.

FIG. 12 shows the construction of a moving body detecting apparatus for determining the speed of movement of an object according to Equation (12).

Figure 13A:
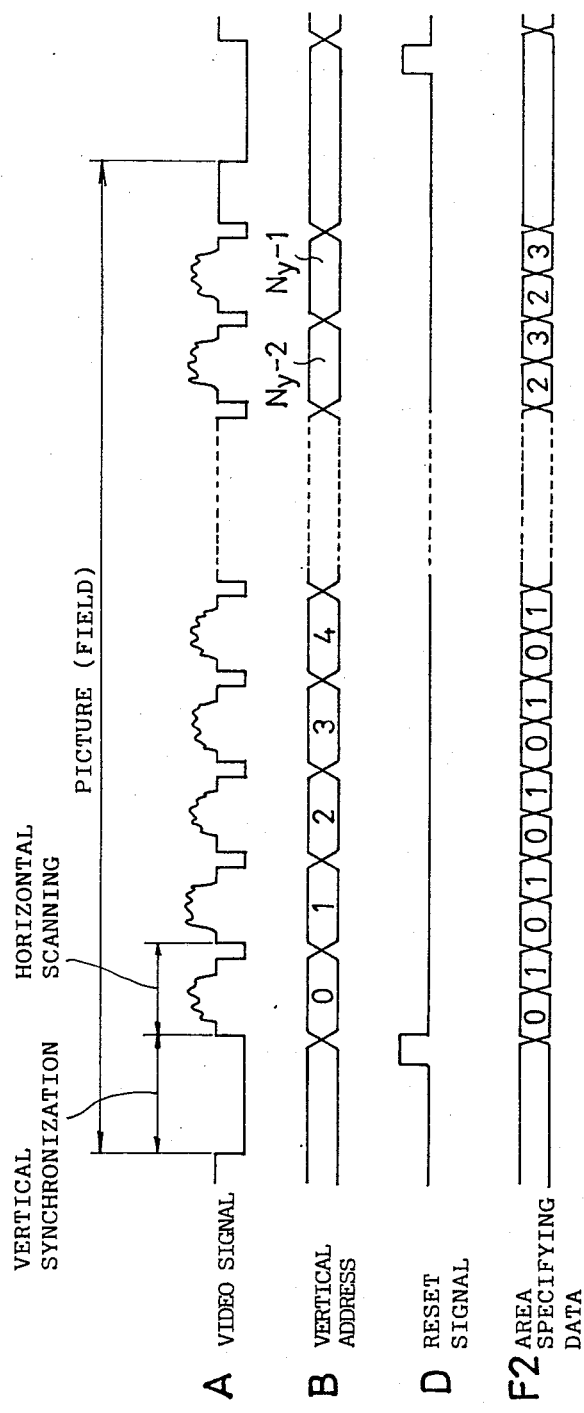
Figure 13C:
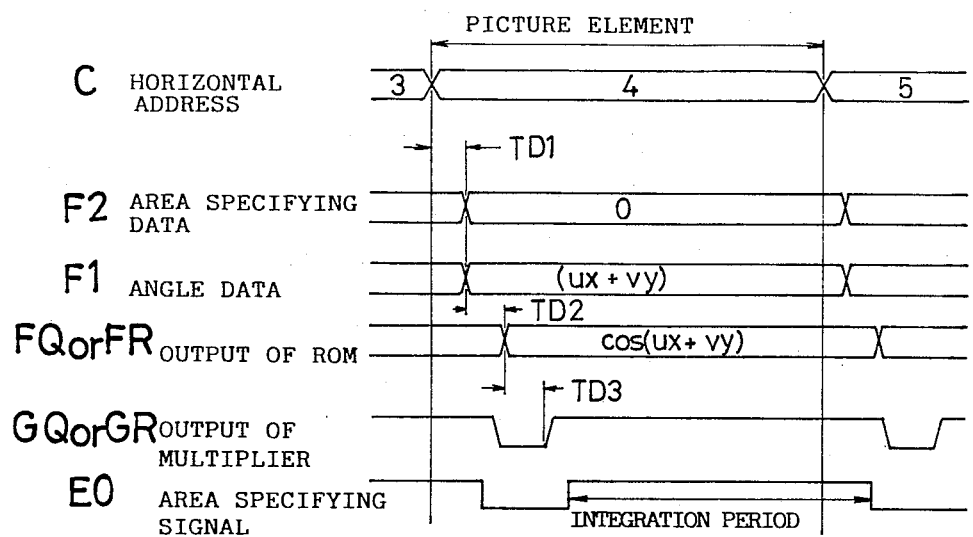

FIGS. 13a and 13c show the output signals from blocks of the apparatus.

Figure 14A:
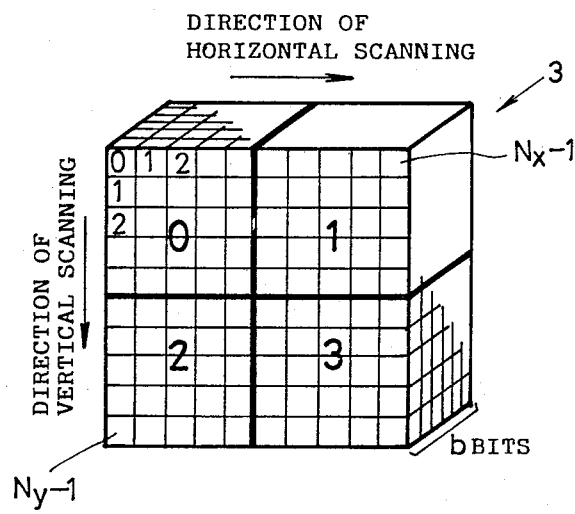
FIGS. 14a and 14b show the construction of a RAM.
Figure 14B:
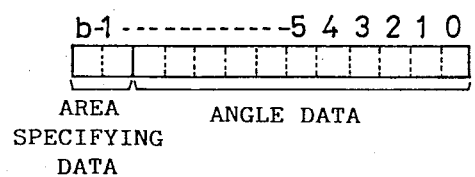

As seen in FIG. 14a, a RAM 3 is divided into a plurality of areas, i.e. into four areas 0 to 3 with the present embodiment. Each area is rectangular. Since the RAM 3 is in corresponding relation to the field of view of a TV camera 1, the fact that the RAM 3 is divided into areas means that the field of view of the camera 1 is divided into similar areas. As will become apparent from the description to follow, the operation of Equation (6) is performed for each area, and a spatial filter output is obtained for each area. Accordingly if a moving body is present in each divided area of the field of view of the camera 1, spatial filter outputs for the moving bodies will be obtained individually. These areas need not always be rectangular as illustrated but can be in any desired shape, such as a trapezoidal or circular shape. Unlike the RAM shown in FIG. 2, each memory location of the RAM 3 has stored therein angle data (Ux+Vy) (see Equations (9) and (10)) as to the corresponding picture element on the TV camera 1 and area specifying data designating the area containing that element (see FIG. 14b). The signals of the angle data and area specifying data read out from the RAM 3 by address signals B and C are represented by F1 and F2 respectively.

Figure 15:
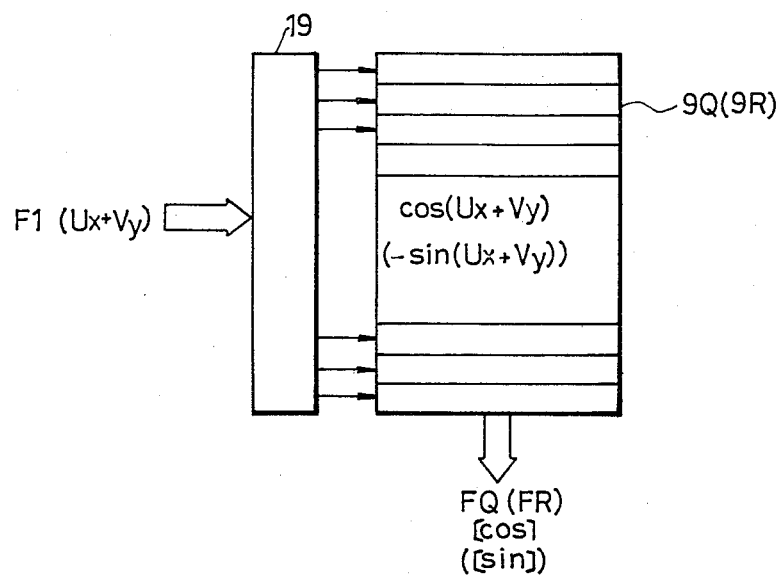
FIG. 15 shows the construction of a ROM.

ROM's 9Q and 9R are for storing cos (Ux+Vy) (hereinafter referred to simply as "cos") and −sin (Ux+Vy) (hereinafter referred to simply as "sin") according to the value of angle data (Ux+Vy). The cos or sin value is positive or negative. The cos or sin is expressed, for example, in 8 bits within the ROM 9Q or 9R. The MSB thereof represents a positive or negative sign, the other seven digits representing the absolute value of the cos or sin. FIG. 15 shows the construction of the ROM 9Q (9R) in greater detail. A signal F1 delivered from the RAM 3 is fed to a decoder 19. Based on the value of the angle data given, the location having the corresponding cos or sin is addressed, and the cos or sin value is read out. The read-out data is a signal FQ (FR).

Multipliers 5Q and 5R calculate f(x,y)·cos and f(x,y)·sin, and the results are fed out as signals GQ and GR.

An integrator 6Q integrates the output GQ from the multiplier 5Q for each of the areas 0 to 3. More specifically the integrator 6Q comprises four integration circuits provided from the areas individually and such as the one shown in FIG. 8. The switches 44 of these integration circuits are on-off controlled by area specifying signals E0 to E3 given by a decoder 10. The decoder 10 decodes the area specifying data signal F2 read out from the RAM 3 and delivers the signal E0-E3 showing the result of decoding only when receiving a gate signal E from the control circuit 2. The signals E0 to E3 represent the areas 0 to 3 individually. As shown in FIG. 13c, there are a time delay TD1 for reading out the data from the RAM 3, a time delay TD2 for reading out the cos from the ROM 9Q and a delay TD3 involved in the multiplier 5Q. The gate signal E excludes such delays and retrace period to determine an integration period for integrating the effective input signal only. Only during the integration period, the switch 44 of the integration circuit corresponding to the area specified by the signal F2 is turned on to integrate the input signal GQ for the area. Each of outputs HQ0 to HQ3 from the integrator 6Q represents the Q in Equation (9) for each of the areas 0 to 3 in corresponding relation.

An integrator 6R integrates the input GR for each of the areas 0 to 3 and is the same as the integrator 6Q in construction and operation. Each of outputs HR0 to HR3 from the integrator 6R represents the R in Equation (10) for each of the areas 0 to 3 in corresponding relation.

Figure 16:
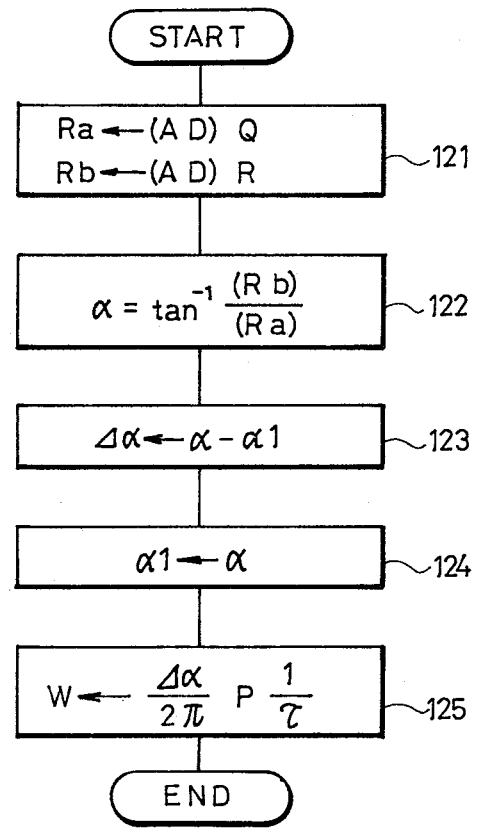
FIG. 16 is a flow chart showing an arithmetic process for measuring the speed of movement.

FIG. 16 shows a process for calculating the speed of movement W of the object in one area by the CPU 4. The process is started by an interruption with an input from an AD converter circuit 7 every time one picture is completely scanned by the TV camera 1. The process is executed upon every interruption. The items of data read from the circuit 7 upon every interruption and correspond-into the signals HQ1-HQ3 and HR0-HR3 are expressed as (AD)Q and (AD)R respectively. It is assumed that the pitch P of the spatial filters is already calculated as:

$$P = 2\pi / \sqrt{\left(\frac{U}{Ax}\right)^2 + \left(\frac{V}{Ay}\right)^2}$$

wherein Ax and Ay represents the lengths in X and Y directions of the camera view field corresponding to one area. The phase angle calculated during the preceding scanning operation is indicated at $\alpha 1$.

With reference to FIG. 16, the items of AD-converted data (AD)Q and (AD)R are read from the AD converter circuit 7 and loaded into registers Ra and Rb in the CPU 4 (step 121). With use of the data in the registers Ra and Rb, the phase angle $\alpha$ is calculated from Equation (11) in step 122. The variation $\Delta\alpha$ is calculated from the phase angle $\alpha$ and the preceding phase angle $\alpha 1$ (step 123). The current phase angle is stored as $\alpha 1$ for the next operation (step 124). The speed W is calculated from Equation (12) in step 125. The direction of movement of the object can be detected by checking the polarity of $\Delta\alpha$ as already stated.

The scanning time required for the TV camera is usually about 16.7 ms for one field or about 33.3 ms for one frame. With the present invention, at least the speed and direction of movement of a moving body can be detected through a high-speed processing from information on one picture. Accordingly the invention is useful for bodies performing a complex motion or moving at a high speed. Furthermore information can be obtained as to a moving body in a desired area set in the field of view of the TV camera, so that when the field of view of the camera is divided into a plurality of areas, items of information for moving bodies can be obtained individually. Thus information can be obtained by a single TV camera, for example, as to vehicles running on a road. The invention is therefore useful for measuring the amount of traffic.

What is claimed is:

1. An apparatus for detecting a moving body comprising:
   pickup means for picking up an object and delivering video signals thereof,
   memory means for storing values of spatial filter function in corresponding relation to the picture elements of the pickup means,
   means for successively reading out from the memory means the values of spatial filter function corresponding to the picture elements in synchronism with scanning by the pickup means,
   means for multiplying the read-out spatial filter function values by the video signals from the pickup means,
   means for integrating the multiplied signals for a required area, and
   means for calculating required information as to the object from the result of integration.

2. An apparatus as defined in claim 1, which further comprises a high pass filter for cutting off the components of frequencies, lower than a frequency corresponding to a spatial frequency, of the video signal delivered from the pickup means.

3. An apparatus as defined in claim 1 or 2 which has means for specifying a preset area in the imaging plane of the pickup means, and the integrating means integrates the multiplied signals for the specified area.

4. An apparatus as defined in claim 3 wherein data specifying the preset area of the imaging plane of the pickup means is stored in the memory means along with the spatial filter function values in corresponding relation to the picture elements.

5. An apparatus for detecting a moving body comprising:
   pickup means for picking up an object and delivering video signals thereof,
   memory means for storing values of complex number spatial filter function in corresponding relation to the picture elements of the pickup means,
   means for successively reading out from the memory means the values of real number components and imaginary number components of the spatial filter function corresponding to the picture elements in synchronism with the scanning by the pickup means,
   means for individually multiplying the read-out spatial filter function components by the video signals from the pickup means,
   means for individually integrating the multiplied signals for each component as to a required area, and
   means for calculating required information as to the object from the results of integration.

6. An apparatus as defined in claim 5 which further comprises a high pass filter for cutting off the components of frequencies, lower than a frequency corresponding to a spatial frequency, of the video signal delivered from the pickup means.

7. An apparatus as defined in claim 5 which has means for specifying a preset area in the imaging plane of the pickup means, and the integrating means integrates the multiplied signals for the specified area.

8. An apparatus as defined in claim 5 wherein data specifying a preset area of the imaging plane of the pickup means is stored in the memory means along with the spatial filter function values in corresponding relation to the picture elements.

9. An apparatus as defined in any one of claims 5 to 8 wherein the calculating means calculates a phase angle from the results of integration of real number components and imaginary number components in respect of one picked-up picture to calculate the speed and direction of movement of the object from a variation in the phase angle.

* * * * *